Sept. 21, 1965  R. A. CUNNINGHAM  3,207,090
ADJUSTABLE PRESSURE PELLETING MACHINE
Filed Nov. 19, 1962  2 Sheets-Sheet 1
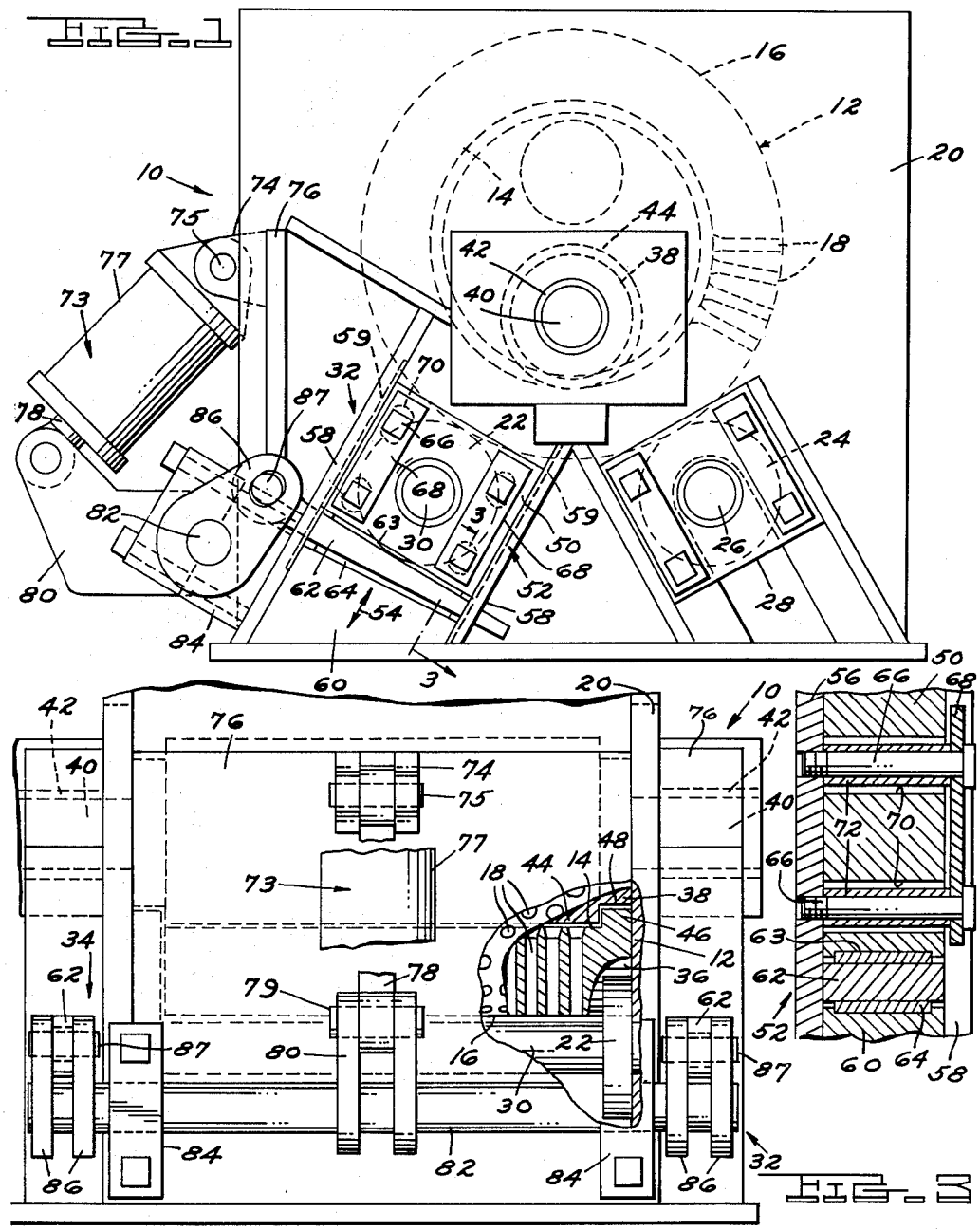
INVENTOR.
ROBERT A. CUNNINGHAM
BY
Whittemore, Hulbert & Belknap
ATTORNEYS

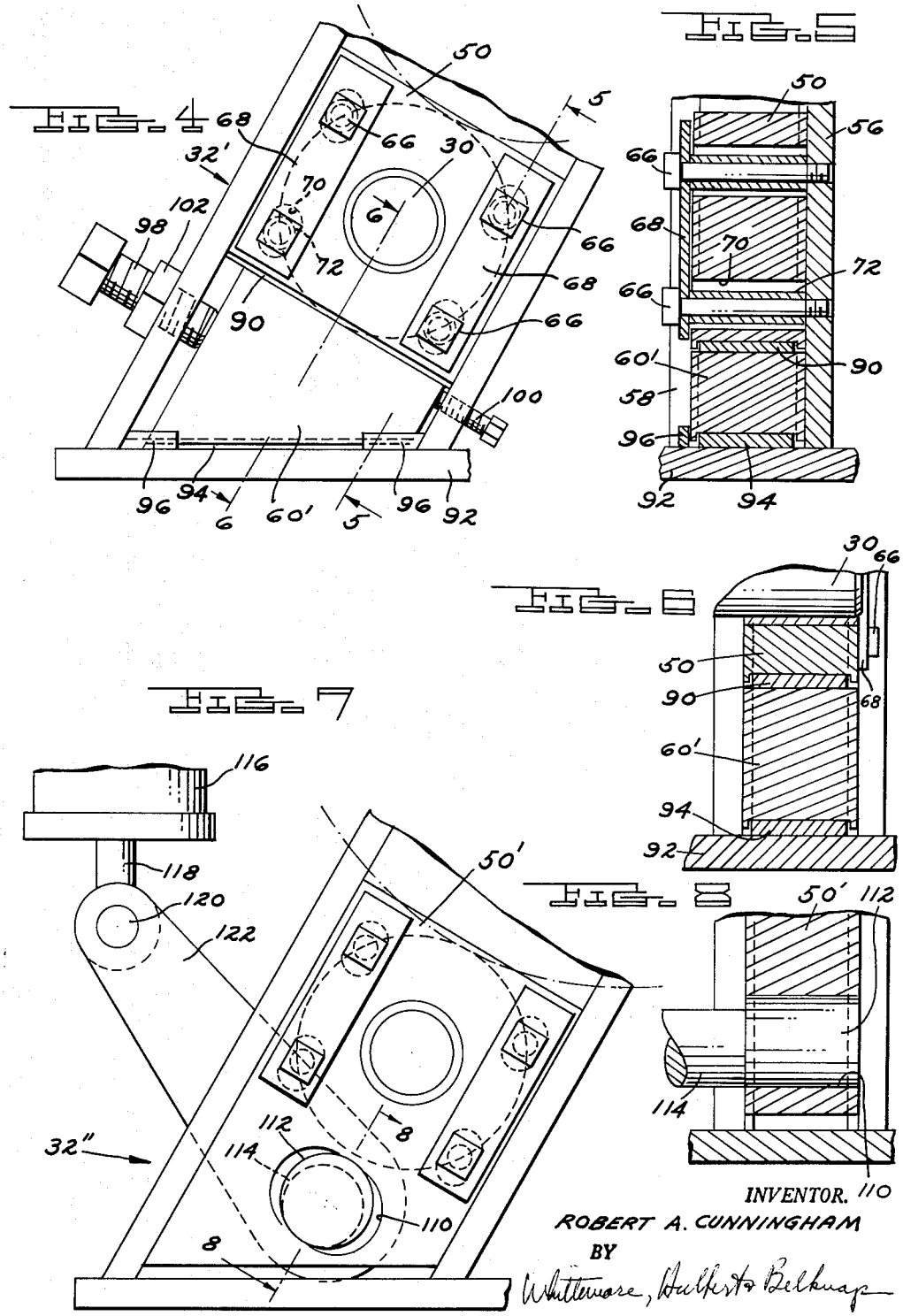

United States Patent Office 3,207,090
Patented Sept. 21, 1965

3,207,090
ADJUSTABLE PRESSURE PELLETING
MACHINE
Robert A. Cunningham, Chicago, Ill., assignor, by direct and mesne assignments, to Cunningham & Sons, Chicago, Ill., a partnership
Filed Nov. 19, 1962, Ser. No. 238,436
5 Claims. (Cl. 107—14)

This invention relates generally to a machine for compressing a cut crop into pellet or wafer form.

An essential object of the invention is to provide a machine for compressing a cut crop into a dense pellet or wafer form having means for adjusting the machine to vary the density of the pellet or wafer.

Another object is to provide a machine for compressing and pelleting a cut crop having a pelleting member provided with holes through which the cut crop is to be pressed, a pressure member adapted to press the cut crop into and through the holes, and means for supporting the members in selected positions of adjustment closer to or farther from each other, as desired. It has been found that a denser pellet will be produced by increasing the spacing between the pelleting member and pressure member.

Another object is to provide a machine wherein the means for supporting the members in selected positions of adjustment includes a cam and means for moving the cam, the cam being non-reversible so that the adjustment will be maintained until the cam is moved by the moving means.

Another object is to provide a machine for compressing and pelleting a cut crop including a rotatable ring having circumferentially spaced holes extending generally radially therethrough, a pressure roll mounted inside the ring adapted to press the cut crop into and through the holes, means including a roller supporting the ring, and means for adjustably positioning the roller to support the ring closer to or farther from the pressure roll, as desired.

Another object is to provide a machine wherein the means for adjustably positioning the roller includes a tapered wedge.

Another object is to provide a machine wherein the means for adjustably positioning the roller includes a rotatable eccentric.

Other objects and features of the invention will become apparent as the description proceeds, especially when taken in conjunction with the accompanying drawings, wherein:

FIGURE 1 is an elevational view of a pelleting machine embodying the invention.

FIGURE 2 is a fragmentary elevational view of the pelleting machine, with parts broken away and in section, looking from the left in FIGURE 1.

FIGURE 3 is a fragmentary sectional view taken on the line 3—3 of FIGURE 1.

FIGURE 4 is a fragmentary elevational view corresponding to a portion of the structure shown in FIGURE 1, illustrating a modification.

FIGURE 5 is a sectional view taken on the line 5—5 of FIGURE 4.

FIGURE 6 is a sectional view taken on the line 6—6 of FIGURE 4.

FIGURE 7 is a view similar to FIGURE 4, showing another modification.

FIGURE 8 is a sectional view taken on the line 8—8 of FIGURE 7.

Referring now more particularly to the drawings and especially to FIGURES 1–3, the machine there illustrated is generally indicated at 10 and includes a wafering ring or drum 12 formed with concentric radially inner and outer surfaces 14 and 16. The ring has holes 18 extending radially therethrough from the radially inner to the radially outer surface thereof. The holes are arranged preferably in axially spaced rows, with the holes in each row circumferentially spaced from each other.

The ring 12 is supported for rotation within the housing 20 by back-up rolls 22 and 24. A pair of the back-up rolls 24 are mounted on the shaft 26 near the ends thereof in axially spaced relation. Only one of the back-up rolls 24 may be seen in FIGURE 1. The shaft 26 is supported in fixed position with its axis parallel to the axis of the pelleting ring 12 by stationary means including the bearing block 28. A pair of the back-up rolls 22 are mounted on a shaft 30 near the ends thereof in axially spaced relation. Only one of the backup rolls 22 may be seen in FIGURE 1. The shaft 30 is disposed with its axis parallel to the axis of the pelleting ring and is supported at the ends for movement at right angles to its axis along a line approximately through the center of the pelleting ring, by the adjustable bearing support structure 32 and 34. Only the bearing support structure 32 is shown in detail in FIGURES 1 and 3, it being understood that the structure 34 is of the identical construction. The pairs of back-up rolls 22 and the pairs of back-up rolls 24 are spaced apart axially far enough to span the apertured outer surface 16 of the pelleting ring 12 and to engage the unapertured lateral surface extensions 36 of the ring.

Extending within the ring on an axis parallel thereto is a pressure roll 38 provided with spindles 40 journaled in bearings 42 in the housing 20. The pressure roll has an enlarged central cylindrical portion 44 of a width corresponding to that of the apertured portion of the pelleting ring.

It will be noted that the pelleting ring 12 has inwardly projecting annular rims 46 on opposite sides of the cylindrical inner apertured surface 14. The enlarged central portion 44 of the pressure roll fits between these rims. There is a clearance between the cylindrical surface of the enlarged central portion 44 of the pressure roll and the opposed apertured inner surface 14 of the ring. The cylindrical portions 48 of the pressure roll on opposite sides of the enlarged central portion 44 closely approach, although preferably they do not contact, the rims 6.

Suitable means are provided to drive the pressure roll 38 and the pelleting ring 12. Preferably, the pressure roll is rotated at a rate such that the peripheral speed of the surface of its central portion 44 exceeds the peripheral speed of the radially inner apertured surface 14 of the ring. Hence there is a rubbing or chafing action on the crop material between these surfaces as it is pressed radially outward through the apertures 18. Preferably, the surface of the cylindrical portion 44 of the pressure roll is knurled to increase the cutting and rubbing action on the crop to break it up into fine particles.

It has been found that the density of the pellet formed by the operation of this machine is dependent upon the clearance between the pressure roll and the radially inner surface of the pelleting ring. As this distance or spacing is increased, the pellet density increases. This is because a greater clearance allows an accumulation of crop material to build up between the adjacent surfaces of the pressure roll and pelleting ring, increasing the resistance to the movement of the crop material through the holes. In order to vary the space between the pressure roll and the pelleting ring, the shaft 30 supporting the back-up rolls 22 is moved toward and away from the axis of the pelleting ring.

Referring more particularly to FIGURES 1 and 3, the bearing structure 32 includes a bearing block 50 which rotatably supports one end of shaft 30 and is guided for generally up and down movement by the frame 52. The movement permitted by this frame is in the direction of the arrows 54 which is at right angles to shaft 30 and on a line substantially through the center of the pelleting ring 12. The frame 52 is composed of the back plate 56 and the side plates 58 which latter are recessed at 59 to slidably receive the bearing block. A base block 60 is supported in fixed position at the bottom of the frame, and an elongated, tapered wedge 62 is provided, extending across the frame in the space between the base block 60 and the bearing block 50. Suitable wear strips 63 and 64 are provided between the surfaces of the wedge, bearing block and base block. The bearing block is clamped against the back plate 56 by the bolts 66 which extend through cover plates 68, through elongated apertures 70 in the bearing block and thread into the back plate. Suitable spacer sleeves 72 are provided on the bolt shanks to abut the back plate 56 and the cover plates 68 to hold the cover plates spaced from the bearing block. The arrangement is such that the bearing block can move along the inclined length of the frame 52 within the limits provided by the length of the elongated slots 70. The position of the bearing block along the frame is dependent upon the wedge 62. If the wedge is moved in an inward direction, that is to the right in FIGURE 1, the bearing block is raised, and the bearing block is lowered by an opposite movement of the wedge.

It will be understood that the bearing support structure 34 for the other end of shaft 30 is exactly the same as bearing support structure 32.

The movement of the wedge is accomplished by a double-acting hydraulic piston-cylinder assembly 73 pivoted at one end to the brackets 74 by a pin 75, the brackets being carried by a fixed plate portion 76 of the machine frame. The rod 78 extending from the piston (not shown) of the cylinder 77 is pivoted by pin 79 to a lever 80 secured to the shaft 82 supported in fixed journals 84 in parallel relation to the shaft 30. At the ends of the shaft 82 are provided the levers 86 which are fixed to the shaft at one end and pivoted by pin 87 to the corresponding wedge 62 at the other end. Wedge 62 has an oversized hole receiving pin 87 to permit the straight line movement of the wedge. It will be apparent that when the rod of the cylinder 77 is extended, the wedges will be withdrawn, or moved to the left in FIGURE 1, to lower the bearing blocks and hence increase the clearance between the pelleting ring and the pressure roll. The wedges move simultaneously to effect identical movements of the bearing blocks of each of the bearing support structures 32 and 34.

The taper of the wedge is very small so that in effect it is non-reversible. That is, the weight of the bearing block will not disturb the adjustment of the wedge, which will be maintained until moved by operation of the cylinder assembly 73.

FIGURES 4, 5 and 6 show a modification of the bearing support structure, here designated 32', in which corresponding parts are given the same characters of reference. In this instance, the wedge 62 is omitted and the base block 60', substantially like the base block 60, supports the bearing block 50 in adjusted position directly. A wear plate 90 is provided between th adjacent surfaces of the two blocks. The base block is slidable upon the base plate 92 of the frame and is guided in its movement by wear plate 94 and guide strips 96. It will be noted that the surface of the base block adjacent the bearing block is at an angle with respect to its surface adjacent the base plate of the frame. Accordingly, the base block serves as a wedge and as it is moved back and forth, the bearing block will be raised and lowered. The screws 98 and 100 are provided to fix the position of the base block. The screw 98 threads through a bar 102 and also through side plate 58 of the frame, its free end engaging the base block. The screw 100 threads through the other side plate 58 of the frame, its free end engaging the opposite surface of the base block. By manipulation of the screws, either threading them in or backing them off, the position of the base block may be changed to locate the bearing block in the position desired. It will be understood that the bearing support structure for the opposite end of the shaft 30 would be identical to the one shown.

FIGURES 7 and 8 show another form of the bearing support structure, here designated 32", in which the bearing block 50', substantially like the bearing block 50 previously described, is formed with a lower extension provided with a non-circular, elongated aperture 110 within which engages the eccentric 112 on shaft 114. It will be understood that the bearing block of the other bearing support structure will be similarly constructed and will be engaged by a corresponding eccentric on the opposite end of the shaft 114. The shaft 114 is mounted in stationary bearings (not shown) and is oscillated by a double-acting hydraulic cylinder 116, the rod 118 extending from the piston therein being pivoted at 120 to one end of a lever 122. The opposite end of the lever is secured to the shaft 114. The other end of the cylinder, not shown, is pivoted to allow for the movement of lever 122. By rotating the shaft 114 in one direction or the other by the hydraulic cylinder, the bearing block 50' may be raised or lowered due to the action of the eccentric 112 in hole 110.

What I claim as my invention is:

1. In a machine for compressing and pelleting a cut crop, a rotatable ring having circumferentially spaced holes extending generally radially therethrough and through which the cut crop is to be pressed, a presser roll mounted inside said ring adjacent the inner surface thereof adapted to press the cut crop into and through said holes, means including first and second laterally spaced roller devices for supporting said ring in variable positions closer to or farther from said presser roll while maintaining the axes of said ring and roll parallel, said devices being spaced apart a distance less than the diameter of said ring and cradling said ring therebetween, means supporting said second roller device for movement in opposite directions toward and away from said ring including a support member, a guide slidably supporting said support member for movement in said opposite directions, means for locating said support member in selected positions along said guide including a tapered wedge, and means for moving said wedge including a hydraulic assembly, and linkage between said hydraulic assembly and wedge, the taper of said wedge being of such small degree that said wedge is non-reversible whereby it will maintain its adjustment.

2. In a machine for compressing and pelleting a cut crop, a rotatable ring having circumferentially spaced holes extending generally radially therethrough and through which the cut crop is to be pressed, a presser roll mounted inside said ring adjacent the inner surface thereof adapted to press the cut crop into and through said holes, means including first and second laterally spaced roller devices for supporting said ring in variable positions closer to or farther from said presser roll while maintaining the axes of said ring and roll parallel, each roller device including a shaft having axially spaced rollers thereon, said devices being spaced apart less than the diameter of said ring, said ring being cradled between said roller devices and supported thereon by means of said axially spaced rollers of each device being in peripheral contact with said ring near the ends thereof, said first roller device being fixed in position, means supporting said second roller device for movement in opposite directions toward and away from said ring including bearing members respectively engageable with the ends of the shaft of said second roller device, guides slidably supporting said bearing members for movement in said opposite directions, means for supporting said bearing members in selected positions along said guides including tapered wedges respectively engageable with said bearing members, and single means for moving said wedges comprising a hydraulic piston-cylinder assembly, and mechanical linkage between said assembly and wedges, the taper of said wedges being of such small degree that said wedges are non-reversible.

3. In a machine for compressing and pelleting a cut crop, a rotatable ring having circumferentially spaced holes extending generally radially therethrough and through which the cut crop is to be pressed, a presser roll mounted inside said ring adjacent the inner surface thereof adapted to press the cut crop into and through said holes, means including first and second laterally spaced roller devices for supporting said ring in variable positions closer to or farther from said pressure roll while maintaining the axes of said ring and roll parallel, said devices being spaced apart a distance less than the diameter of said ring and cradling said ring therebetween, means supporting said second roller device for movement in opposite directions toward and away from said ring along a line substantially through the center of said ring, said supporting means including a support member, a guide slidably supporting said member for movement in said opposite directions, and means for positively locating said support member in selected positions of adjustment along said guide.

4. The structure defined in claim 3, wherein said locating means includes a tapered wedge, and means for moving said wedge, the taper of said wedge being of such small degree that said wedge is non-reversible whereby it will maintain its adjustment.

5. The structure defined in claim 3 wherein said locating means includes a rotatable eccentric, and means for rotating said eccentric.

References Cited by the Examiner

UNITED STATES PATENTS

| | | | |
|---|---|---|---|
| 457,395 | 8/91 | Bowen | 100—168 |
| 1,467,883 | 9/23 | Sizer | 107—14 |
| 2,241,546 | 5/41 | Evenstad et al. | 107—8.35 |
| 2,295,838 | 9/42 | Glaze | 107—8.35 |
| 2,336,114 | 12/43 | Meakin | 18—12 |
| 2,674,162 | 4/54 | Haug | 241—228 X |
| 2,715,871 | 8/55 | Dosne et al. | 100—168 X |
| 2,782,736 | 2/57 | Johnson | 107—14 |
| 3,055,242 | 9/62 | Wilson | 100—168 |

FOREIGN PATENTS

| | | |
|---|---|---|
| 20,970 of 1929 | 7/30 | Australia. |
| 13,861 | 6/81 | Germany. |
| 552,230 | 6/32 | Germany. |
| 589,372 | 12/33 | Germany. |

WALTER A. SCHEEL, *Primary Examiner.*

UNITED STATES PATENT OFFICE
CERTIFICATE OF CORRECTION

Patent No. 3,207,090 September 21, 1965

Robert A. Cunningham

It is hereby certified that error appears in the above numbered patent requiring correction and that the said Letters Patent should read as corrected below.

Column 5, line 15, for "pressure" read -- presser --; line 23, after "said" insert -- support --.

Signed and sealed this 12th day of April 1966.

(SEAL)
Attest:

ERNEST W. SWIDER
Attesting Officer

EDWARD J. BRENNER
Commissioner of Patents